US008620275B2

(12) United States Patent
Minear et al.

(10) Patent No.: US 8,620,275 B2
(45) Date of Patent: *Dec. 31, 2013

(54) SERVER PROCESSING IN PROVIDING MESSAGES FOR A WIRELESS DEVICE CONNECTING TO A SERVER

(75) Inventors: Brian Minear, San Diego, CA (US); Mazen Chmaytelli, San Diego, CA (US); Mitchell B. Oliver, San Diego, CA (US); Stephen A. Sprigg, Poway, CA (US)

(73) Assignee: QUALCOMM Incorporated, San Diego, CA (US)

( * ) Notice: Subject to any disclaimer, the term of this patent is extended or adjusted under 35 U.S.C. 154(b) by 502 days.

This patent is subject to a terminal disclaimer.

(21) Appl. No.: 12/045,536

(22) Filed: Mar. 10, 2008

(65) Prior Publication Data

US 2008/0155017 A1 Jun. 26, 2008

Related U.S. Application Data

(63) Continuation of application No. 11/349,613, filed on Feb. 7, 2006, now abandoned, which is a continuation of application No. 10/232,910, filed on Aug. 30, 2002, now Pat. No. 6,996,394.

(51) Int. Cl.
*H04M 11/10* (2006.01)
*H04L 29/06* (2006.01)
*G06Q 30/00* (2012.01)

(52) U.S. Cl.
USPC ...... 455/412.1; 370/352; 455/41.2; 455/90.2; 455/414.1; 455/456.1; 455/556.1; 705/14.14; 705/14.23; 705/14.64; 705/52; 709/203; 709/206; 709/224; 725/62

(58) Field of Classification Search
USPC ............ 455/412.1, 412.2, 414.2, 41.2, 414.1, 455/414.3, 456.1; 705/14, 26, 52, 14.64; 348/14.01; 709/203, 206, 224; 725/62; 370/352

See application file for complete search history.

(56) References Cited

U.S. PATENT DOCUMENTS 5,572,643 A 11/1996 Judson
5,594,779 A 1/1997 Goodman
(Continued)

FOREIGN PATENT DOCUMENTS

CA 2267549 9/2000
CA 2381025 2/2001
(Continued)

OTHER PUBLICATIONS

International Search Report—PCT/US03/027021—International Search Authority—US—Feb. 26, 2004.

(Continued)

*Primary Examiner* — Gerald Gauthier
(74) *Attorney, Agent, or Firm* — Fariba Yadegar-Bandari

(57) ABSTRACT

A system and method for providing a message on the graphic display of a wireless device while the wireless device is connecting to an application download server across a wireless network. When the wireless device attempts to communicate with an application download server or changes files while navigating an application download server, a message is transmitted across the wireless network to the computer platform of the wireless device and displayed to the user of the wireless device. The message can be transmitted to the wireless device from the same application download server that the wireless device is attempting to connect to or navigate, or alternately, the message can be transmitted from another server on the wireless network.

40 Claims, 4 Drawing Sheets

(56) References Cited

U.S. PATENT DOCUMENTS

| | | |
|---|---|---|
| 5,721,827 A | 2/1998 | Logan et al. |
| 5,732,216 A | 3/1998 | Logan et al. |
| 5,737,619 A | 4/1998 | Judson |
| 5,738,583 A | 4/1998 | Comas et al. |
| 5,740,549 A | 4/1998 | Reilly et al. |
| 5,809,415 A | 9/1998 | Rossmann |
| 5,822,324 A | 10/1998 | Kostreti et al. |
| 5,848,396 A | 12/1998 | Gerace |
| 5,852,775 A | 12/1998 | Hidary |
| 5,930,701 A | 7/1999 | Skog |
| 5,933,811 A | 8/1999 | Angles et al. |
| 5,937,347 A | 8/1999 | Gordon |
| 5,966,663 A | 10/1999 | Gleason |
| 5,983,117 A | 11/1999 | Sandler et al. |
| 6,009,410 A | 12/1999 | LeMole et al. |
| 6,018,710 A | 1/2000 | Wynblatt et al. |
| 6,032,039 A | 2/2000 | Kaplan |
| 6,047,051 A | 4/2000 | Ginzboorg et al. |
| 6,067,570 A | 5/2000 | Kreynin et al. |
| 6,072,946 A | 6/2000 | Dooley et al. |
| 6,097,962 A | 8/2000 | Corriveau et al. |
| 6,098,102 A | 8/2000 | Nielsen et al. |
| 6,167,253 A | 12/2000 | Farris et al. |
| 6,167,255 A | 12/2000 | Kennedy, III et al. |
| 6,185,586 B1 | 2/2001 | Judson |
| 6,185,682 B1 | 2/2001 | Tang |
| 6,237,022 B1 | 5/2001 | Bruck et al. |
| 6,275,496 B1 | 8/2001 | Burns et al. |
| 6,282,435 B1 | 8/2001 | Wagner et al. |
| 6,298,373 B1 | 10/2001 | Burns et al. |
| 6,311,056 B1 | 10/2001 | Sandidge |
| 6,317,780 B1 | 11/2001 | Cohn et al. |
| 6,317,791 B1 | 11/2001 | Cohn et al. |
| 6,324,182 B1 | 11/2001 | Burns et al. |
| 6,332,127 B1 | 12/2001 | Bandera et al. |
| 6,335,101 B1 | 1/2002 | Haeger et al. |
| 6,336,101 B1 | 1/2002 | Dean et al. |
| 6,338,094 B1 | 1/2002 | Scott et al. |
| 6,356,543 B2 | 3/2002 | Hall et al. |
| 6,363,258 B1 | 3/2002 | Schmidt et al. |
| 6,363,419 B1 | 3/2002 | Martin, Jr. et al. |
| 6,366,947 B1 | 4/2002 | Kavner |
| 6,378,069 B1 | 4/2002 | Sandler et al. |
| 6,389,278 B1 | 5/2002 | Singh |
| 6,401,113 B2 | 6/2002 | Lazaridis et al. |
| 6,405,037 B1 | 6/2002 | Rossmann |
| 6,405,309 B1 | 6/2002 | Cheng et al. |
| 6,430,409 B1 | 8/2002 | Rossman |
| 6,438,585 B2 | 8/2002 | Mousseau et al. |
| 6,463,463 B1 | 10/2002 | Godfrey et al. |
| 6,463,464 B1 | 10/2002 | Lazaridis et al. |
| 6,473,609 B1 | 10/2002 | Schwartz et al. |
| 6,477,150 B1 | 11/2002 | Maggenti et al. |
| 6,477,565 B1 | 11/2002 | Daswani et al. |
| 6,493,751 B1 | 12/2002 | Tate et al. |
| 6,496,775 B2 | 12/2002 | McDonald, Jr. et al. |
| 6,505,201 B1 | 1/2003 | Haitsuka et al. |
| 6,507,727 B1 | 1/2003 | Henrick |
| 6,546,002 B1 | 4/2003 | Kim |
| 6,567,854 B1 | 5/2003 | Olshansky et al. |
| 6,571,281 B1 | 5/2003 | Nickerson |
| 6,571,290 B2 | 5/2003 | Selgas et al. |
| 6,578,142 B1 | 6/2003 | Anderson et al. |
| 6,580,914 B1 | 6/2003 | Smith |
| 6,587,127 B1 | 7/2003 | Leeke et al. |
| 6,587,684 B1 | 7/2003 | Hsu et al. |
| 6,591,288 B1 | 7/2003 | Edwards et al. |
| 6,603,844 B1 | 8/2003 | Chavez et al. |
| 6,615,186 B1 | 9/2003 | Kolls |
| 6,622,174 B1 | 9/2003 | Ukita et al. |
| 6,625,578 B2 | 9/2003 | Spaur et al. |
| 6,650,901 B1 | 11/2003 | Schuster et al. |
| 6,654,615 B1 | 11/2003 | Chow et al. |
| 6,658,455 B1 | 12/2003 | Weinman, Jr. |
| 6,680,935 B1 * | 1/2004 | Kung et al. .................. 370/352 |
| 6,708,203 B1 | 3/2004 | Makar et al. |
| 6,708,205 B2 | 3/2004 | Sheldon et al. |
| 6,715,043 B1 | 3/2004 | Stevens |
| 6,721,578 B2 | 4/2004 | Minear et al. |
| 6,763,226 B1 * | 7/2004 | McZeal, Jr. .................. 455/90.2 |
| 6,769,010 B1 | 7/2004 | Knapp et al. |
| 6,771,290 B1 | 8/2004 | Hoyle |
| 6,790,142 B2 | 9/2004 | Okada et al. |
| 6,856,820 B1 | 2/2005 | Kolls |
| 6,862,445 B1 | 3/2005 | Cohen |
| 6,868,155 B1 | 3/2005 | Cannon et al. |
| 6,871,218 B2 | 3/2005 | Desai et al. |
| 6,874,029 B2 | 3/2005 | Hutcheson et al. |
| 6,882,850 B2 | 4/2005 | McConnell et al. |
| 6,892,226 B1 | 5/2005 | Tso et al. |
| 6,914,891 B2 | 7/2005 | Ha et al. |
| 6,947,705 B2 | 9/2005 | Tsuchiuchi |
| 6,947,772 B2 | 9/2005 | Minear et al. |
| 6,957,076 B2 * | 10/2005 | Hunzinger .................. 455/456.3 |
| 6,970,443 B2 | 11/2005 | Dynarski et al. |
| 6,985,934 B1 | 1/2006 | Armstrong et al. |
| 6,990,534 B2 | 1/2006 | Mikhailov et al. |
| 6,996,394 B2 * | 2/2006 | Minear et al. .............. 455/412.1 |
| 6,996,537 B2 | 2/2006 | Minear et al. |
| 6,999,431 B2 | 2/2006 | Rines |
| 7,003,289 B1 | 2/2006 | Kolls |
| 7,008,317 B2 | 3/2006 | Cote et al. |
| 7,016,334 B2 | 3/2006 | Cohen et al. |
| 7,020,690 B1 | 3/2006 | Haitsuka et al. |
| 7,027,801 B1 | 4/2006 | Hall et al. |
| 7,039,164 B1 | 5/2006 | Howe |
| 7,039,398 B2 | 5/2006 | Chmaytelli et al. |
| 7,046,689 B2 | 5/2006 | Burns et al. |
| 7,046,956 B2 | 5/2006 | Cohen |
| 7,062,543 B2 | 6/2006 | Kishimoto |
| 7,065,342 B1 | 6/2006 | Rolf |
| 7,065,388 B2 | 6/2006 | Minear et al. |
| 7,076,244 B2 | 7/2006 | Lazaridis et al. |
| 7,103,048 B1 | 9/2006 | Nozawa |
| 7,103,368 B2 | 9/2006 | Teshima |
| 7,103,671 B2 | 9/2006 | Quiggle et al. |
| 7,113,776 B2 | 9/2006 | Minear et al. |
| 7,136,915 B2 | 11/2006 | Rieger, III |
| 7,136,920 B2 * | 11/2006 | Castell et al. .................. 709/224 |
| 7,139,551 B2 | 11/2006 | Jamadagni |
| 7,142,812 B1 | 11/2006 | Brankovic et al. |
| 7,155,508 B2 | 12/2006 | Sankuratripati et al. |
| 7,155,681 B2 | 12/2006 | Mansour et al. |
| 7,174,305 B2 | 2/2007 | Carruthers et al. |
| 7,181,415 B2 | 2/2007 | Blaser et al. |
| 7,197,277 B2 * | 3/2007 | Davies et al. .................. 455/41.2 |
| 7,200,142 B1 | 4/2007 | Loghmani |
| 7,218,918 B1 | 5/2007 | Alston |
| 7,236,774 B2 | 6/2007 | Lee |
| 7,248,861 B2 | 7/2007 | Lazaridis et al. |
| 7,251,476 B2 | 7/2007 | Cortegiano |
| 7,251,478 B2 * | 7/2007 | Cortegiano .................. 455/412.1 |
| 7,266,371 B1 | 9/2007 | Amin et al. |
| 7,272,385 B2 * | 9/2007 | Mirouze et al. .............. 455/414.1 |
| 7,283,805 B2 | 10/2007 | Agrawal |
| 7,284,066 B1 | 10/2007 | Philyaw et al. |
| 7,292,870 B2 | 11/2007 | Heredia et al. |
| 7,321,920 B2 | 1/2008 | Washburn |
| 7,359,720 B2 | 4/2008 | Hartmaier et al. |
| 7,376,696 B2 | 5/2008 | Bell et al. |
| 7,389,271 B2 * | 6/2008 | Arai .................. 705/52 |
| 7,403,905 B2 * | 7/2008 | Shioda et al. .............. 705/14.64 |
| 7,409,203 B2 | 8/2008 | Zabawskyj et al. |
| 7,411,546 B2 | 8/2008 | Pitt et al. |
| 7,424,293 B2 | 9/2008 | Zhu |
| 7,426,380 B2 | 9/2008 | Hines et al. |
| 7,426,532 B2 | 9/2008 | Bell et al. |
| 7,471,236 B1 | 12/2008 | Pitt et al. |
| 7,478,056 B1 | 1/2009 | Lu |
| 7,489,273 B2 | 2/2009 | Pitt et al. |
| 7,490,135 B2 | 2/2009 | Klug et al. |
| 7,516,196 B1 | 4/2009 | Madan et al. |
| 7,516,213 B2 | 4/2009 | Cunningham et al. |
| 7,548,611 B2 | 6/2009 | Howe |

(56) References Cited

U.S. PATENT DOCUMENTS

| | | | |
|---|---|---|---|
| 7,558,559 B2* | 7/2009 | Alston | 455/412.1 |
| 7,558,884 B2 | 7/2009 | Fuller et al. | |
| 7,577,771 B2 | 8/2009 | Steeb et al. | |
| 7,626,951 B2 | 12/2009 | Croy et al. | |
| 7,629,926 B2 | 12/2009 | Pitt et al. | |
| 7,660,914 B2 | 2/2010 | Perez et al. | |
| 7,668,144 B2 | 2/2010 | Taylor et al. | |
| 7,672,879 B1 | 3/2010 | Kumar et al. | |
| 7,688,211 B2 | 3/2010 | Borovoy et al. | |
| 7,688,811 B2 | 3/2010 | Kubler et al. | |
| 7,724,878 B2 | 5/2010 | Timmins et al. | |
| 7,756,485 B2 | 7/2010 | Paas et al. | |
| 7,764,219 B2 | 7/2010 | Pitt et al. | |
| 7,782,254 B2 | 8/2010 | Pitt et al. | |
| 7,805,132 B2 | 9/2010 | Zabawskyj et al. | |
| 7,810,723 B2 | 10/2010 | Boardman et al. | |
| 7,814,148 B2 | 10/2010 | Bell et al. | |
| 7,825,780 B2 | 11/2010 | Pitt | |
| 7,844,491 B1 | 11/2010 | Haitsuka et al. | |
| 7,849,131 B2 | 12/2010 | Van De Sluis | |
| 7,870,592 B2 | 1/2011 | Hudson et al. | |
| 7,890,102 B2 | 2/2011 | Zhu | |
| 7,894,825 B2* | 2/2011 | Wallace et al. | 455/456.1 |
| 7,899,450 B2 | 3/2011 | Pitt et al. | |
| 7,904,503 B2 | 3/2011 | Van De Sluis | |
| 7,904,516 B2* | 3/2011 | Chern | 709/206 |
| 7,907,551 B2 | 3/2011 | Croy et al. | |
| 7,912,446 B2 | 3/2011 | Zhu et al. | |
| 7,929,530 B2 | 4/2011 | Marshall et al. | |
| 7,965,222 B2 | 6/2011 | Pitt et al. | |
| 7,966,013 B2 | 6/2011 | D'souza et al. | |
| 8,005,434 B2 | 8/2011 | Paas et al. | |
| 8,027,695 B2 | 9/2011 | Zabawskyj et al. | |
| 8,032,112 B2 | 10/2011 | Hines et al. | |
| 8,032,119 B2 | 10/2011 | Alston | |
| 8,059,789 B2 | 11/2011 | Hines et al. | |
| 8,068,587 B2 | 11/2011 | Geldenbott et al. | |
| 8,081,817 B2 | 12/2011 | Tedesco et al. | |
| 8,082,552 B2 | 12/2011 | Agrawal | |
| 8,089,401 B2 | 1/2012 | Pitt et al. | |
| 8,117,037 B2 | 2/2012 | Gazdzinski | |
| 8,126,458 B2 | 2/2012 | Zhu | |
| 8,126,889 B2 | 2/2012 | Pitt | |
| 8,135,620 B2 | 3/2012 | Barsade et al. | |
| 8,150,363 B2 | 4/2012 | Dickinson et al. | |
| 8,150,911 B2 | 4/2012 | Bell et al. | |
| 8,160,504 B2 | 4/2012 | Paas et al. | |
| 8,185,087 B2 | 5/2012 | Mitchell, Jr. et al. | |
| 8,188,936 B2 | 5/2012 | Fuller et al. | |
| 8,190,151 B2 | 5/2012 | D'souza et al. | |
| 8,200,819 B2 | 6/2012 | Chung et al. | |
| 8,208,605 B2 | 6/2012 | Geldenbott et al. | |
| 8,219,153 B2 | 7/2012 | Gil et al. | |
| 8,229,458 B2 | 7/2012 | Busch | |
| 8,315,599 B2 | 11/2012 | Kasad et al. | |
| 8,336,664 B2 | 12/2012 | Wallace et al. | |
| 8,364,171 B2 | 1/2013 | Busch | |
| 8,369,825 B2 | 2/2013 | Dickinson et al. | |
| 8,369,967 B2 | 2/2013 | Hoffberg et al. | |
| 8,380,134 B2 | 2/2013 | Paas et al. | |
| 8,385,881 B2 | 2/2013 | Zhu et al. | |
| 8,385,964 B2 | 2/2013 | Haney | |
| 8,406,728 B2 | 3/2013 | Dickinson et al. | |
| 8,437,776 B2 | 5/2013 | Busch | |
| 8,447,331 B2 | 5/2013 | Busch | |
| 2001/0013020 A1 | 8/2001 | Yoshida et al. | |
| 2001/0048676 A1 | 12/2001 | Jimenez et al. | |
| 2002/0002047 A1 | 1/2002 | Fujiwara | |
| 2002/0002605 A1 | 1/2002 | Honda | |
| 2002/0004855 A1 | 1/2002 | Cox et al. | |
| 2002/0006124 A1 | 1/2002 | Jimenez et al. | |
| 2002/0010740 A1 | 1/2002 | Kikuchi et al. | |
| 2002/0019831 A1* | 2/2002 | Wade | 707/500 |
| 2002/0032019 A1 | 3/2002 | Marks et al. | |
| 2002/0036655 A1 | 3/2002 | Yulevich et al. | |
| 2002/0046299 A1 | 4/2002 | Lefeber et al. | |
| 2002/0072355 A1 | 6/2002 | Jeong et al. | |
| 2002/0087335 A1 | 7/2002 | Meyers et al. | |
| 2002/0090985 A1 | 7/2002 | Tochner et al. | |
| 2002/0095456 A1 | 7/2002 | Wensheng | |
| 2002/0107027 A1 | 8/2002 | O'Neil | |
| 2002/0107737 A1 | 8/2002 | Kaneko et al. | |
| 2002/0115449 A1 | 8/2002 | Allen | |
| 2002/0123336 A1 | 9/2002 | Kamada | |
| 2002/0128029 A1 | 9/2002 | Nishikawa et al. | |
| 2002/0154558 A1 | 10/2002 | Urata et al. | |
| 2002/0159387 A1 | 10/2002 | Allison et al. | |
| 2002/0160752 A1 | 10/2002 | Hook et al. | |
| 2002/0161637 A1* | 10/2002 | Sugaya | 705/14 |
| 2002/0165773 A1 | 11/2002 | Natsuno et al. | |
| 2002/0188838 A1 | 12/2002 | Welder | |
| 2002/0193094 A1 | 12/2002 | Lawless et al. | |
| 2002/0194414 A1 | 12/2002 | Bateman et al. | |
| 2002/0194592 A1 | 12/2002 | Tsuchida et al. | |
| 2002/0194593 A1 | 12/2002 | Tsuchida et al. | |
| 2003/0006911 A1 | 1/2003 | Smith et al. | |
| 2003/0007627 A1 | 1/2003 | Elsey et al. | |
| 2003/0017826 A1 | 1/2003 | Fishman et al. | |
| 2003/0041125 A1 | 2/2003 | Salomon | |
| 2003/0050837 A1* | 3/2003 | Kim | 705/14 |
| 2003/0054833 A1 | 3/2003 | Hayduk | |
| 2003/0055735 A1 | 3/2003 | Cameron et al. | |
| 2003/0055872 A1 | 3/2003 | Meidan et al. | |
| 2003/0065802 A1 | 4/2003 | Vitikainen et al. | |
| 2003/0067903 A1 | 4/2003 | Jorgensen | |
| 2003/0097350 A1 | 5/2003 | ShamRao | |
| 2003/0114106 A1 | 6/2003 | Miyatsu et al. | |
| 2003/0114157 A1 | 6/2003 | Spitz et al. | |
| 2003/0143991 A1 | 7/2003 | Minear | |
| 2003/0163369 A1 | 8/2003 | Arr | |
| 2003/0172044 A1 | 9/2003 | ShamRao | |
| 2003/0191729 A1 | 10/2003 | Siak et al. | |
| 2003/0206194 A1 | 11/2003 | Boyd | |
| 2004/0203681 A1* | 10/2004 | Ross et al. | 455/418 |
| 2004/0204063 A1* | 10/2004 | Van Erlach | 455/556.1 |
| 2005/0120242 A1 | 6/2005 | Mayer et al. | |
| 2005/0215238 A1* | 9/2005 | Macaluso | 455/414.1 |
| 2005/0270570 A1 | 12/2005 | Fujitani et al. | |
| 2005/0278230 A1* | 12/2005 | Shirasaka et al. | 705/26 |
| 2005/0282535 A1 | 12/2005 | Chmaytelli et al. | |
| 2006/0094410 A1* | 5/2006 | Cortegiano | 455/414.3 |
| 2006/0141993 A1 | 6/2006 | Minear et al. | |
| 2006/0190330 A1* | 8/2006 | Tollinger et al. | 705/14 |
| 2006/0287040 A1 | 12/2006 | Walker et al. | |
| 2007/0042760 A1* | 2/2007 | Roth | 455/414.3 |
| 2007/0054672 A1* | 3/2007 | Onishi et al. | 455/456.1 |
| 2007/0060117 A1 | 3/2007 | Fishman et al. | |
| 2007/0066365 A1 | 3/2007 | Minear et al. | |
| 2008/0045195 A1* | 2/2008 | Cortegiano | 455/414.3 |
| 2008/0090613 A1 | 4/2008 | Dowling | |
| 2008/0182569 A1 | 7/2008 | Chmaytelli et al. | |
| 2008/0225815 A1 | 9/2008 | Minear et al. | |
| 2008/0288478 A1 | 11/2008 | Klug et al. | |
| 2009/0011740 A1* | 1/2009 | Aggarwal et al. | 455/412.1 |
| 2010/0174756 A1 | 7/2010 | Lazaridis et al. | |
| 2011/0185411 A1 | 7/2011 | Selgas et al. | |

FOREIGN PATENT DOCUMENTS

| | | |
|---|---|---|
| CA | 2199757 | 5/2003 |
| CL | 1301-1993 | 1/1995 |
| CL | 1621-1997 | 7/1998 |
| CL | 1437-1999 | 12/1999 |
| CL | 1787-2001 | 7/2002 |
| CN | 1300146 | 6/2001 |
| CN | 1364016 | 8/2002 |
| EP | 1122929 A1 | 8/2001 |
| EP | 1143679 | 10/2001 |
| EP | 1162805 | 7/2009 |
| JP | 113072 | 1/1999 |
| JP | 1168987 | 3/1999 |
| JP | 11-187470 | 7/1999 |
| JP | 2000163367 | 6/2000 |
| JP | 2000222331 A | 8/2000 |

(56) References Cited

FOREIGN PATENT DOCUMENTS

| | | |
|---|---|---|
| JP | 2001134531 | 5/2001 |
| JP | 2001202437 A | 7/2001 |
| JP | 2001209611 A | 8/2001 |
| JP | 2001216440 | 8/2001 |
| JP | 2001256151 | 9/2001 |
| JP | 2001-306923 | 11/2001 |
| JP | 2001306434 | 11/2001 |
| JP | 2001312666 A | 11/2001 |
| JP | 2002-014890 | 1/2002 |
| JP | 2002014919 | 1/2002 |
| JP | 2002032402 A | 1/2002 |
| JP | 2002044733 | 2/2002 |
| JP | 2002133170 A | 5/2002 |
| JP | 2002163542 A | 6/2002 |
| JP | 2005516323 | 6/2005 |
| JP | 4563684 | 8/2010 |
| KR | 2001-0106325 | 11/2001 |
| KR | 20010103907 | 11/2001 |
| KR | 1020010106356 | 11/2001 |
| KR | 20020006374 A | 1/2002 |
| KR | 2002-0025472 | 4/2002 |
| KR | 100703368 | 4/2007 |
| RU | 2073913 | 2/1997 |
| RU | 2112325 | 5/1998 |
| RU | 2127951 | 3/1999 |
| RU | 10929 | 8/1999 |
| RU | 2178628 | 1/2002 |
| TW | 364242 | 7/1999 |
| TW | 457825 | 10/2001 |
| WO | WO9739548 | 10/1997 |
| WO | 9750062 A1 | 12/1997 |
| WO | WO9802793 | 1/1998 |
| WO | WO9831172 | 7/1998 |
| WO | WO9909486 | 2/1999 |
| WO | WO9909486 A1 | 2/1999 |
| WO | WO9943136 | 8/1999 |
| WO | 9956207 A1 | 11/1999 |
| WO | WO0049793 | 8/2000 |
| WO | WO0062564 | 10/2000 |
| WO | WO0078005 | 12/2000 |
| WO | WO0078010 | 12/2000 |
| WO | WO0101225 | 1/2001 |
| WO | WO0154284 | 7/2001 |
| WO | WO0160014 | 8/2001 |
| WO | WO0161913 A2 | 8/2001 |
| WO | WO0184868 | 11/2001 |
| WO | WO0203199 | 1/2002 |
| WO | WO0221506 A1 | 3/2002 |
| WO | WO0279981 | 10/2002 |
| WO | WO03065596 | 8/2003 |
| WO | WO03065743 | 8/2003 |

OTHER PUBLICATIONS

International Preliminary Examination Report—PCT/US2003/027021, International Preliminary Examining Authority/US-Alexandria, Virginia-Feb. 28, 2005.

De Jong et al., "A VoD Application Implemented in Java", Multimedia Tools and Applications, 5, 161-170 (1997) Kluwer Academic Publishers. Manufactured in The Netherlands.

Stefan Funfrocken, Enabling Technologies: Infrastructure for Collaborative Enterprises., Proceedings Sixth IEEE workshops on"How to Integrate Mobile Agents into Web Servers," Jun. 18-20, 1997, pp. 97-99.

U.S. Appl. No. 12/057,139, "Applicant Arguments/Remarks made in an amendment", Jan. 6, 2009.

U.S. Appl. No. 12/057,139, "Office Action", Apr. 30, 2009.

U.S. Appl. No. 12/057,139, "Office Action", Oct. 6, 2008.

European Search Report—EP03791917, Search Authority—Hague—Oct. 21, 2009.

U.S. Appl. No. 10/689,969, "Applicant Arguments/Remarks made in an Amendment", Nov. 14, 2005.

U.S. Appl. No. 10/689,969, "Applicant Arguments/Remarks made in an Amendment", Oct. 20, 2003.

U.S. Appl. No. 10/689,969, "Office Action", Oct. 20, 2003.

U.S. Appl. No. 10/689,969, "Office Action",Aug. 11, 2005.

U.S. Appl. No. 10/689,969, "Office Action",Jan. 24, 2006.

U.S. Appl. No. 90/008,816, "Applicant Arguments/Remarks made in an amendment", Jan. 22, 2009.

U.S. Appl. No. 90/008,816, "Applicant Arguments/Remarks made in an amendment", Nov. 4, 2008.

U.S. Appl. No. 90/008,816, "Office Action", Jun. 23, 2009.

U.S. Appl. No. 90/008,816, "Office Action", Sep. 4, 2008.

U.S. Appl. No. 90/008,816, "Request for Ex-Parte Reexamination of U.S. Patent No. 7,065,388 Granted", Nov. 23, 2007.

U.S. Appl. No. 90/008,816, "Request for Ex-Parte Reexamination of U.S. Patent No. 7,065,388", Oct. 17, 2007.

U.S. Appl. No. 90/008,816, "Response", Aug. 24, 2009.

\* cited by examiner

US 8,620,275 B2

SERVER PROCESSING IN PROVIDING MESSAGES FOR A WIRELESS DEVICE CONNECTING TO A SERVER

CROSS-REFERENCE TO RELATED APPLICATIONS

The subject application is a continuation of, and claims priority from U.S. patent application Ser. No. 11/349,613, filed on Feb. 7, 2006, and entitled "Server Processing in Providing Messages for a Wireless Device Connecting to a Server," which is a continuation of, and claims priority from U.S. patent application Ser. No. 10/232,910, filed on Aug. 30, 2002, and entitled "Server Processing in Providing Messages for a Wireless Device Connecting to a Server," now U.S. Pat. No. 6,996,394, both of which are incorporated herein by reference in their entirety.

BACKGROUND OF THE INVENTION

I. Field of the Invention

The present invention generally relates to wireless networks and computer communications across the wireless networks. More particularly, the invention relates to the provision of messages for display on a wireless device while the wireless device attempts to connect with an application download server across a wireless network, or navigates in between application download servers or file structures therewithin.

II. Description of the Related Art

Wireless devices, such as cellular telephones, communicate packets including voice and data over a wireless network. Cellular telephones themselves are being manufactured with increased computing capabilities and are becoming tantamount to personal computers and hand-held personal digital assistants ("PDAs"). Some wireless devices, such as select cellular telephones, may have an installed application programming computer platform that allows software developers to create software applications that operate on the wireless device.

It is anticipated that systems and methods will be developed to transfer data to a wireless device. Accordingly, it is desirable to have systems and methods by which data, such as an advertisement, can be transmitted to a wireless device without substantially impacting the connection time of the wireless device to a server transmitting the message.

SUMMARY OF THE INVENTION

In one aspect, an information download system is provided. The system includes a wireless communications interface, for communicating with a wireless device over a wireless network, a first processing component, and a second processing component. The first processing component is coupled with said wireless communications interface, and provides requested information in response to receiving an information download request from said wireless device. The second processing component is coupled to said wireless communications interface and provides a message to said wireless device. The message is unrelated to a status of said information download request, and the message is provided after receiving said information download request and before providing said requested information.

In another aspect, an information download system is provided. The system includes a wireless communications means for communicating with a wireless device over a wireless network, a first processing means, and a second processing means. The first processing means is coupled with said wireless communications means and provides requested information in response to receiving an information download request from said wireless device. The second processing means is coupled to said wireless communications means and provides a message to said wireless device. The message is unrelated to a status of said information download request. The message is provided after receiving said information download request and before providing said requested information.

In still another aspect, a method for providing information to a wireless device is provided. The method includes receiving, over a wireless network, a request for a first information from the wireless device. The method further includes retrieving said first information after receiving the request for the first information from the wireless device. Further included in the method is sending, over the wireless network to the wireless device, a second information. The method further includes sending said retrieved first information to said wireless device, after retrieving said first information. Sending the second information is performed after receiving the request for the first information from the wireless device. Sending the second information is performed before sending said retrieved first information to said wireless device.

In yet another aspect, a machine readable medium comprising instructions, which when executed by the machine causes said machine to perform operations is provided. The instructions include at least one instruction for receiving, over a wireless network, a request for a first information from the wireless device. The instructions further include at least one instruction for retrieving said first information after receiving the request for the first information from the wireless device. Further included in the instructions is at least one instruction for sending, over the wireless network to the wireless device, a second information. The instructions further include at least one instruction for sending said retrieved first information to said wireless device, after retrieving said first information.

In yet another aspect, a method for obtaining requested information over a wireless network is provided. The method includes sending, over the wireless network, a request for a first information. The method further includes receiving, from the wireless network, a second information, after the sending. Further included in the method is receiving, from the wireless network, said first information. Said second information is unrelated to a status of said first information.

In still another aspect, a machine readable medium comprising instructions, which when executed by said machine causes said machine to perform operations is provided. The instructions include at least one instruction for obtaining requested information over a wireless network. The instructions further include at least one instruction for sending, over the wireless network, a request for a first information. The instructions further include at least one instruction for receiving, from the wireless network, a second information, after the sending. Further included in the instructions is at least one instruction for receiving, from the wireless network, said first information. Said second information is unrelated to a status of said first information.

In yet another aspect, a wireless device is provided. The wireless device includes a wireless communications portal for communicating with a wireless network, and a computer platform coupled to said wireless communications portal. The computer platform operates to control said wireless communications portal and includes a processing element and a memory. The memory is for storing a first logic, a second logic, and a third logic. The first logic is configured to control said wireless communications portal to send an information download request over said wireless network. The second logic is configured to control said wireless communications portal to receive over said wireless network information corresponding to said information download request. The third logic is configured to control said wireless communications portal to receive from said wireless network a message unrelated to a status of said information download request during a time between the sending of said information download request and the receipt of information corresponding to said information download request.

In still another aspect, another wireless device is provided. The wireless device includes a wireless communications means for communicating with a wireless network, and a computer platform means coupled to said wireless communications means. The computer platform means operates to control said wireless communications means, and includes a processing element means. The computer platform means further includes a memory means for storing a first logic means, a second logic means, and a third logic means. The first logic means is configured to control said wireless communications means to send an information download request over said wireless network. The second logic means is configured to control said wireless communications means to receive over said wireless network information corresponding to said information download request. The third logic means is configured to control said wireless communications means to receive over said wireless network a message unrelated to a status of said information download request during a time between the sending of said information download request and the receipt of information corresponding to said information download request.

In another embodiment of the present invention, a method for processing a target message for display on a wireless device communicating with an application download server comprises receiving a request from the wireless device at the application download server, initiating the processing of the request from the wireless device, and sending a target message to the wireless device during idle transmission time while processing the request from the wireless device.

In another embodiment of the present invention, a method for processing a target message for display on a wireless device communicating with an application download server comprises receiving a request from the wireless device at the application download server, initiating the processing of the request from the wireless device, sending a signal to a second server indicating that a message may be sent to a wireless device, and sending a message to the wireless device by the second server during idle transmission time between the application download server and the wireless device.

Other objects, advantages, and features of the present invention will become apparent after review of the hereinafter set forth Brief Description of the Drawings, Detailed Description of the Invention, and the Claims.

DETAILED DESCRIPTION OF THE INVENTION

Introduction

Figure 1:
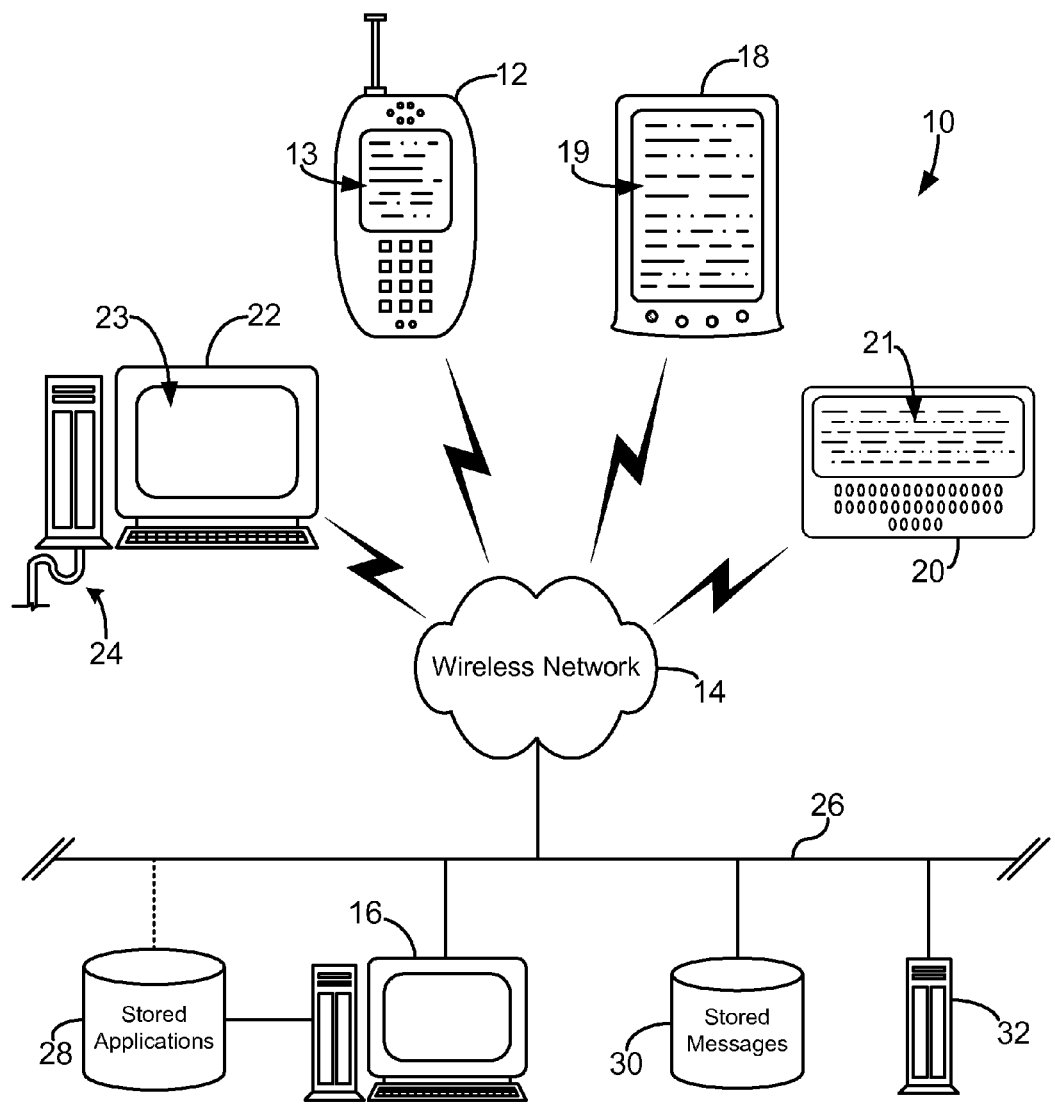
FIG. 1 is a representative diagram of a wireless network and the computer hardware and wireless devices that can be used within the inventive messaging system.

Systems and methods are anticipated that provide for the downloading of software applications to a wireless device. Software applications can come pre-loaded at the time a wireless device is manufactured, or the user may later request that additional programs be downloaded over cellular telecommunication carrier networks, where the programs are executable on the wireless device. As a result, users of wireless devices can customize their wireless devices with programs, such as games, printed media, stock updates, news, or any other type of information or program available for download from application download servers through the wireless network.

In one scenario, if the user of the wireless device desires to download and use a software application using a wireless network, the user will typically either call a service provider or contact the service provider through other means, such as through an Internet access, and the service provider will either transmit the application to the wireless device across the wireless network or allow the user access a network site where the application is downloadable or accessible. To connect to the application download server, the wireless device bridges a communication connection to the wireless network, such as a cellular network, and then attempts to contact an application download server where the desired software application is resident. Once the wireless device contacts the application download server, an initial contact is made and the application download server determines what applications are available to the wireless device and sends the appropriate information, such as a menu, for display on the wireless device so the user can learn of the available applications.

The period between the wireless device's initial contact of the application download server and menu/option display on the wireless device can be significant, lasting several seconds. During the wait period, the graphic display of the wireless device displays either nothing at all until the application download server menu is displayable, or a simple resident message such as "connecting" can be shown to the user.

Accordingly, the present invention provides systems and methods whereby a message, such as an advertisement, can be transmitted and/or displayed to the user of a wireless device while the wireless device is connecting to an application download server. Further, the data comprising the message may be sufficiently compact that the overall connection time is not substantially lengthened.

Systems and methods consistent with the present invention provide a message on the display of a wireless device while the wireless device is connecting to an application download server across a wireless network. When the wireless device attempts to communicate with an application download server across the wireless network, a targeted message, such as an advertisement, is transmitted across the wireless network to the computer platform of the wireless device and displayed to the user of the wireless device. The message can be transmitted to the wireless device from the same application download server that the wireless device computer platform is attempting to connect to or navigate, or the message can be transmitted to the wireless device from another server on the wireless network. The message can include graphics, text, multimedia components, or hyperlinks, all of which are displayable and interactive on the graphic display of the wireless device.

The system particularly includes one or more wireless devices where each wireless device has a computer platform and a graphic display, and the graphic display is operated by the resident driver of the computer platform which can be hardware, firmware, or software. Examples of the wireless device include cellular telephones, text pagers, personal digital assistants (PDAs), or other computer platforms with a wireless link to selectively communicate with a wireless network. The system also includes one or more application download servers that are on the wireless network and each application download server is selectively in communication with the one or more wireless devices and selectively downloading data thereto, such as software applications, graphics, and text.

The wireless devices will attempt to connect with a specific application download server when so instructed by the user, and there is typically a connect wait-period while the application server determines, among other things, what applications can be provided to the wireless device and what the capabilities of the wireless device are. The wireless device typically gains access to a menu or file structure of the application download server wherein the user of the wireless device can navigate within the data structure of the application download server. Other servers can also be present on the networks that are not specifically for application download, such as a messaging-only server that transmits messages to wireless devices.

Thus, in the present invention, when a wireless device attempts to communicate with at least one application download server across the wireless network, a message is transmitted to the computer platform of the wireless device across the wireless network for display to the user during the connection wait-period. The message is able to utilize an otherwise idle period of the wireless device to provide advertisements and other information to the user prior to providing full access of the application download server. The message should compact such that its transmission time in a data stream and execution time on the wireless device are minimal so as not to cause a delay in the overall application download server access time.

For more targeted messaging, as is desirable in advertising, each wireless device can be part of a predefined group, based upon age, location, income, or other preferences listed by the owner of the wireless device. When a wireless device that is part of a predefined group attempts to communicate with the application download server across the wireless network, the application download server will identify the group that the wireless device is part of, and a group-specific message is transmitted to the computer platform of the wireless device. As with any message defined herein, the group-specific message can be transmitted to the wireless device from the same application download server that the wireless device attempted to contact or can be transmitted from another server on the network.

Additionally, the message can be comprised of several different components sent from several different servers, and the components are assembled at the wireless device at the time of display. As an example, a graphics component can be sent from the application download server, an audio file can be sent from a first server, and a hyperlink can be provided from another server. The computer platform of the wireless device will then appropriately assemble the components into a message for display.

Messages can also be transmitted for display at the wireless device beyond the initial attempt to contact the application download server. A second message can be sent upon a wireless device attempting to communicate with a second application download server across the wireless network. And if the wireless device interacts with a file structure on the application download server, a message can be transmitted and displayed on the wireless device when the wireless device attempts to change interaction with a file or otherwise navigates within the data structure of the application download server.

Exemplary Embodiments of the Present Invention

With reference to the figures in which like numerals represent like elements throughout, FIG. 1 illustrates a system 10 for providing subscribed software applications to one or more wireless devices, such as cellular telephone 12, in communication across a wireless network 14 with at least one application download server 16 that selectively downloads software applications or other data to the wireless devices across a wireless communication portal or other data access to the wireless network 14. As shown here, the wireless device can be a cellular telephone 12, with a graphics display 13, a personal digital assistant 18 with PDA screen 19, a pager 20 with a graphics display 21, which is shown here as a two-way text pager, or even a separate computer platform 22 that has a wireless communication portal and a display 23, and may otherwise have a wired connection 24 to a network or the Internet. The system 10 can thus be performed on any form of remote computer module including a wireless communication portal, including without limitation, wireless modems, PCMCIA cards, access terminals, personal computers, access terminals, telephones without a display or keypad, or any combination or sub-combination thereof.

The application download server 16 is shown here on a local server-side network 26 with other computer elements in communication with the wireless network 14, such as a stored application database 28 that contains software applications that are downloadable to be executable on the wireless devices 12, 18, 20, and 22. There is also shown a stand-alone messaging server 32 and with stored message database 30 that transmits messages to the wireless devices for display thereon as herein described. However, messaging server 32 and message database 30 are not necessary as all server-side functions can be performed on one server, such as application download server 16. Further, any computer server-side computer platform can provide separate services and processes to the wireless devices 12, 18, 20, and 22 across the wireless network 14.

Figure 2:
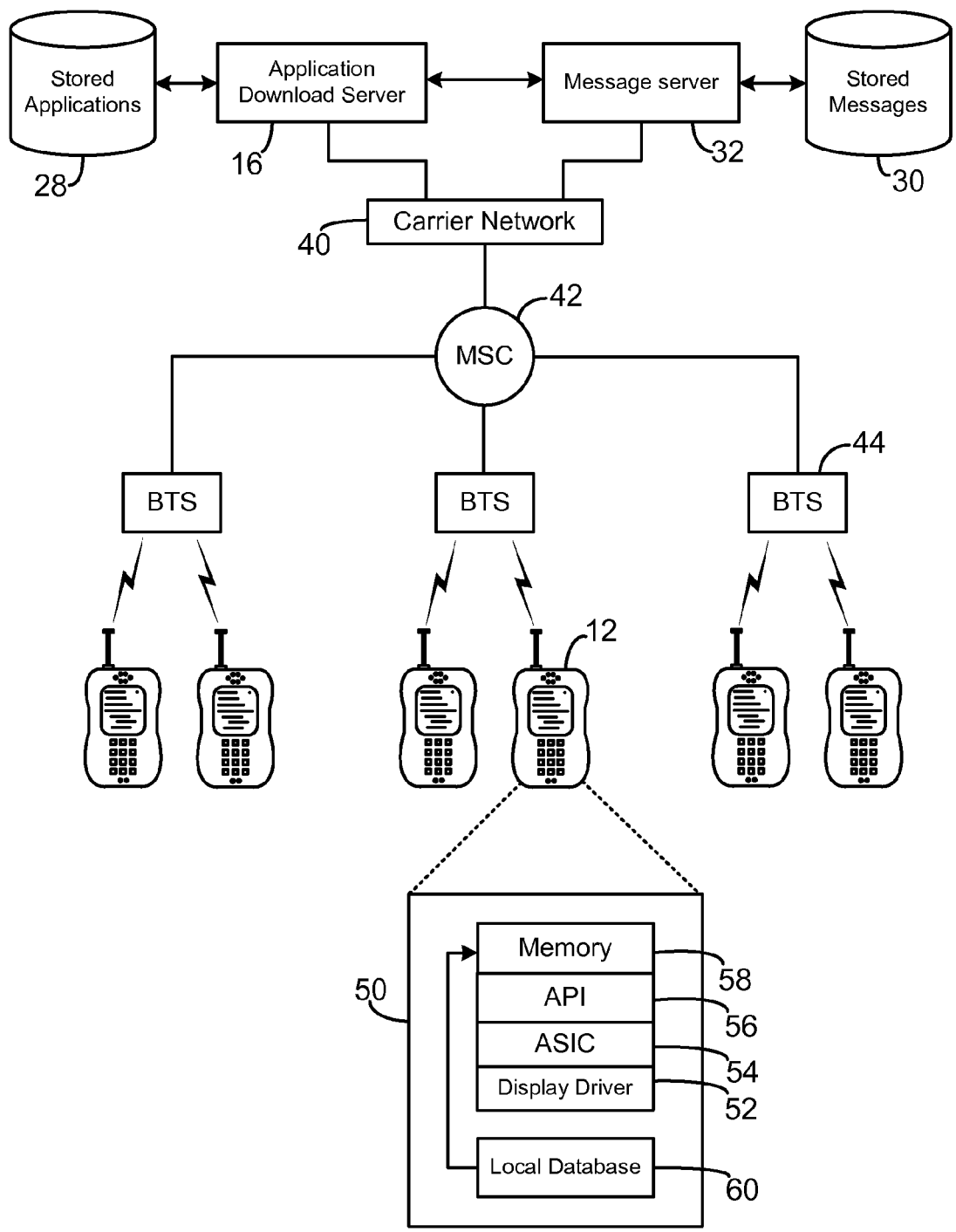
FIG. 2 is a block diagram of the hardware components of the wireless network providing communication between different wireless devices, the application download server, a separate messaging server, and their respective databases.

FIG. 2 is a block diagram that more fully illustrates the components of the wireless network 14 and interrelation of the elements of the system 10. The wireless network 14 is merely exemplary and can include any system whereby remote modules, such as wireless devices 12, 18, 20, and 22, communicate over-the-air between and among each other and/or between and among components of a wireless network 14, including, without limitation, wireless network carriers and/or servers. The application download server 16 and the stored application database 28, messaging server 32, and stored messages database 30, may be present on the cellular data network with other components that are needed to provide cellular telecommunication services. The application download server 16 and/or messaging server 32 communicate with a carrier network 40, through a data link, such as the Internet, a secure LAN, WAN, or other network. The carrier network 40 controls messages (generally being data packets) sent to a messaging service controller ("MSC") 42. The carrier network 40 communicates with the MSC 42 by a network, the Internet and/or POTS ("plain ordinary telephone system"). Typically, the network or Internet connection between the carrier network 40 and the MSC 42 transfers data, and the POTS transfers voice information. The MSC 42 is connected to multiple base stations ("BTS") 44. In a similar manner to the carrier network, the MSC 42 is typically connected to the BTS 44 by both the network and/or Internet for data transfer and POTS for voice information. The BTS 44 ultimately broadcasts messages wirelessly to the wireless devices, such as cellular telephone 12, by short messaging service ("SMS"), or other over-the-air methods known in the art.

The wireless device, such as cellular telephone 12, has a computer platform 50 that can receive and execute software applications transmitted from the application download server 16. The computer platform 50 includes, among other components, a display driver 52 that drives the graphics display 13 and renders images on the graphics display 13 based upon graphics data received at the computer platform 50. The computer platform 50 also includes an application-specific integrated circuit ("ASIC") 54, or other processor, microprocessor, logic circuit, or other data processing device. The ASIC 52 is typically installed at the time of manufacture of the wireless device. The ASIC 52 or other processor executes the application programming interface ("API") layer 56 that interfaces with any resident programs in the memory 58 of the wireless device. The memory can be comprised of read-only or random-access memory (RAM and ROM), EPROM, EEPROM, flash cards, or any memory common to computer platforms. The computer platform 50 also includes a local database 60 that can hold the software applications not actively used in memory 58, such as the software applications downloaded from the application download server 16. The local database 60 is typically comprised of one or more flash memory cells, but can be any secondary or tertiary storage device as known in the art, such as magnetic media, EPROM, EEPROM, optical media, tape, or soft or hard disk.

The wireless device, such as cellular telephone 12, can download many types of applications, such as games and stock monitors, or simply data such as news and sports-related data. The downloaded data can be immediately displayed on the display 13 or stored in the local database 60 when not in use. The software applications can be treated as a regular software application resident on the wireless device 12, 18, 20, and 22, and the user can selectively upload stored resident applications from the local database 60 to memory 58 for execution on the API 56. The user of the wireless device 12, 18, 20, and 22 can also selectively delete a software application from the local database 60.

Figure 3:
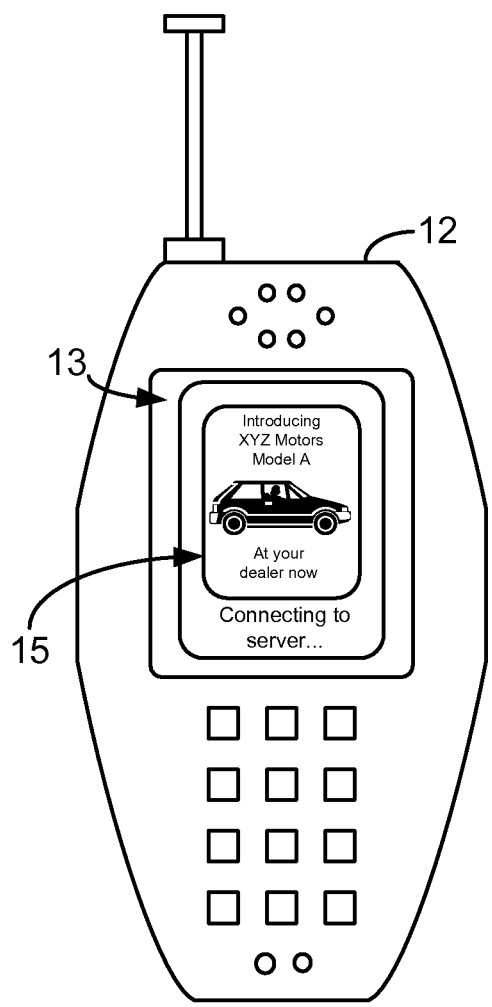
FIG. 3 is a perspective view of the graphic display of a cellular telephone displaying a message while connecting to an application download server in an exemplary embodiment of the present invention.

FIG. 3 illustrates the message 15 displayed upon the graphic display 13 of the cellular telephone 12 when the wireless device 12, 18, 20, and 22 attempts to connect to a server, such as application download server 16 in an exemplary embodiment of the present invention. In the connection wait-period that can last several seconds, the system 10 allows a message 15 to be sent for display on the wireless device 12, 18, 20, and 22 to the user while the wireless device is otherwise idle awaiting data to navigate the application download server 16. When the wireless device attempts to contact the application download server, a connection screen or communication of connection status may be displayed on the graphic display 13, 19, 21, and 23 of the wireless device 12, 18, 20, and 22, and the connection screen may be generated by the wireless device resident operating system or a resident application.

In one embodiment, the system 10, during the connection attempt, transmits a message 15 to the computer platform 50 of the wireless device 12, 18, 20, and 22 such that the message can be displayed on the graphic display 13, 19, 21, and 23 to the user during the connection wait-period. Here, the message 15 is shown as an automobile advertisement and graphic display 13 also informs the end-user that the connection to the application download server 16 is proceeding. The message can include text, graphics, multimedia, or other network objects such as hyperlinks and applets. While the message can include many types of data, it is preferred that the message be compact and maximally utilize the wireless device resources for display and execution so the message transmission does not interfere with the overall connection to the application download server 16. After the wireless device 12, 18, 20, and 22 displays the message 15 during the connection wait-period, the message is preferably supplanted by a display of an options menu or like access screen so that the user has access to the data structure of the application download server 16. Typically, a file menu is displayed on the wireless device 12, 18, 20, and 22 such that the user can navigate through various file layers on the application download server 16 and selectively choose to download an available application.

The message 15 can be transmitted to the wireless device 12, 18, 20, and 22 from the specific application download server 16 that the wireless device attempted to initially contact. Alternately, the message can transmitted to the wireless device 12, 18, 20, and 22 from a messaging server 32 across the wireless network 14, and the messaging server 32. With a messaging server 32, the overhead in transmitting the message can be shifted away from the application download server 16 which has significant resources devoted in the attempt to bridge a connection with the wireless device 12, 18, 20, and 22.

Moreover, the use of multiple servers on the wireless network 14 allows the wireless device 12, 18, 20, and 22 to receive and display messages comprised of several different components sent from several different servers. The message components can be sent separately and are assembled at the wireless device 12, 18, 20, and 22 at the time of display. As an example, a graphics component can be sent from the application download server 16, an executable audio file can be sent from the messaging server 32, and a hyperlink can be provided from another server. The computer platform 50 of the wireless device 12, 18, 20, and 22 will then appropriately integrate and assemble the components into a single message for display, execute the message applications, or queue the message components or separate messages for sequential display. The software components can be simple data representing text, graphics, audio files, or full applets separately executable on the computer platform 50 of the wireless device 12, 18, 20, and 22.

The system 10 can also transmit messages at times other than the initial connection attempt from the wireless device 12, 18, 20, and 22 to the application download server 16, such as when the wireless device attempts to connect to a second server, as occurs when the user of the wireless device activates a hyperlink within a displayed message. Further, the system 10 could also send a message to the wireless device 12, 18, 20, and 22 when the wireless device changes file interaction while navigating the data structure of the application download server 16 (typically a file structure such as in Windows, UNIX, and LINUX). Messages can thus be sent to the wireless device 12, 18, 20, and 22 either in addition to the first message at the initial connection attempt, or at a predetermined interaction interval such as server access change or a file interaction change.

The messages can be targeted to the wireless device user based upon many criteria, including a specific group that the user (or registered owner of the wireless device) belongs to, the application download server 16 desired to be connected to, or the specific file which the user desires to access. The owner of the wireless device can register with a specific group known to the system 10, examples being teenagers, golf enthusiasts, business owners, and the like. When the wireless device 12, 18, 20, and 22 initially attempts to contact the application download server 16, the system 10 can have a specific message targeted to the wireless device as a member of the predefined group. Group membership can be identified automatically in the initial electronic handshake between the wireless device 12, 18, 20, and 22 and the application download server 16, or the system 10 can prompt the end-user of the wireless device 12, 18, 20, and 22 from the application download server 16 or a separate server such as messaging server 32, to designate a specific group, and then once the end-user inputs group identification data, the data can be received from the prompting server (i.e. at the application download server 16 or messaging server 32, or both). In such embodiment, the end-user of the wireless device actually can determine the group so the targeted messaging is more likely to be received by a member of its intended group demographic. And other messages can be targeted based upon the subject matter or context of the message-triggering event, such as the subject matter on a second application download server desired to be accessed, or nature of the file on the application download server 16 desired to be navigated.

Figure 4:
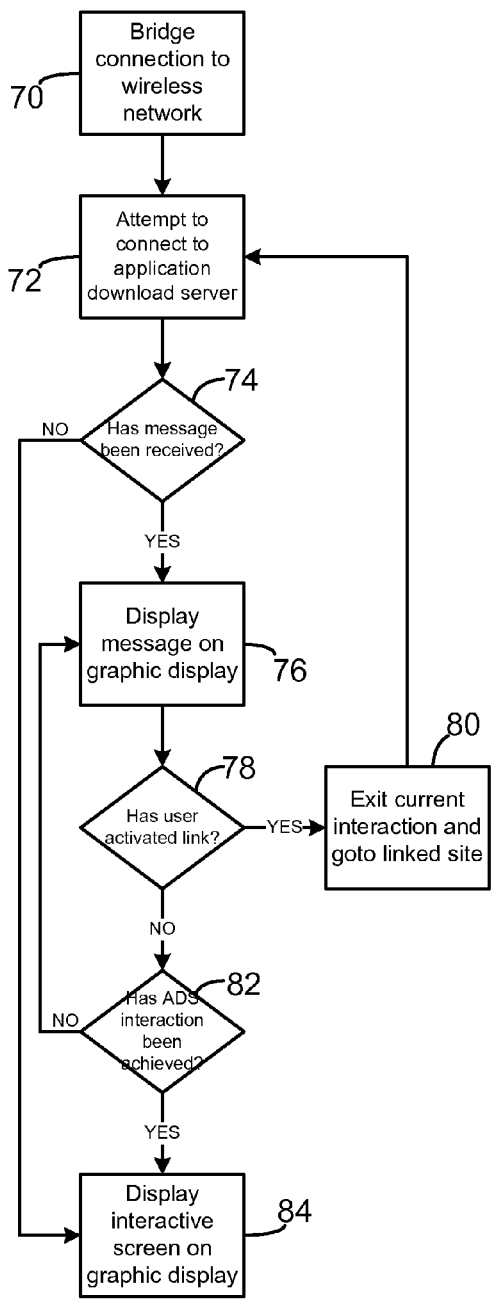
FIG. 4 is a flowchart illustrating the process executing on the wireless device computer platform to attempt to connect to an application download server, and receive and display a message to the user in an exemplary embodiment of the present invention.

In operation of the system 10 as is shown in the flowchart of FIG. 4, the wireless device, such as cellular telephone 12, first attempts to bridge a connection to the wireless network 14, shown by step 70, and once a communication to the wireless network 14 is made, the wireless device attempts to connect to the application download server 16 to access downloadable software applications or data therefrom, as shown at step 72. A decision is then made as to whether a message has been received from the system 10, as shown at decision 74. If a message has not been received at decision 74, then the wireless device simply waits for the full interactive connection to be made with the application download server 16 and displays the application download server 16 interactive screen on the graphic display 13 of the wireless device (such as cellular telephone 12), as shown at step 84. If a message has been sent at decision 74 then the message is displayed on the graphic display 13 of the wireless device 12, as shown at step 76.

If the message is embodied with a hyperlink, the wireless device 12 can make a decision as to whether the user has activated the hyperlink, as shown at decision 78. If the user has activated the hyperlink, then the current interaction session is exited and the wireless device redirects its connection attempt at the linked site, as shown at step 80, and then the wireless device attempts to contact the linked application download server, and returns to step 72. If the user has not activated a link at decision 78, a decision is then made as to whether the application download server 16 interaction has been achieved by the wireless device, as shown at decision 82. If the interaction has not been achieved, then the message is continued displayed on the graphics display 13 of the wireless device 12, as the process returns to step 76. If the application download server 16 interaction has been achieved at decision 82, an application download server 16 interactive screen is displayed on the graphic display 13 of the wireless device 12, as shown at step 84, or otherwise the state of interactivity with the application download server 16 provided by the specific system 10 is entered.

Figure 5:
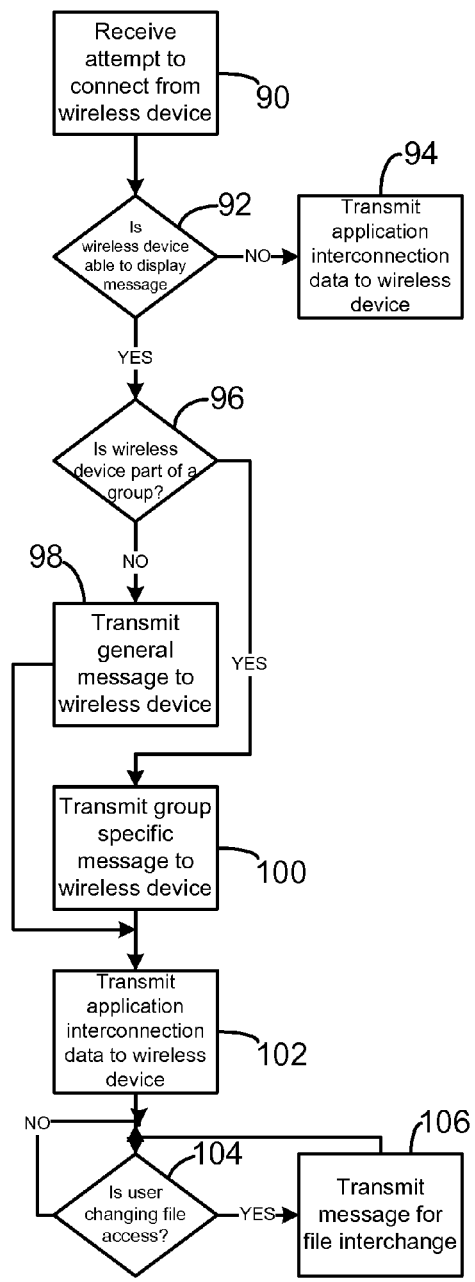
FIG. 5 is a flowchart illustrating the process executing on an application download server receiving a connection attempt from a wireless device, transmitting an appropriate message to the wireless device, and selectively providing other messages to the wireless device as the user of the wireless device navigates the data structure of the application download server in an exemplary embodiment of the present invention.

The flowchart of FIG. 5 illustrates the parallel process on the application download server 16 that occurs in response to the connection attempt from the wireless device 12 as shown in FIG. 4. The application download server 16 initially receives the communication attempt from the wireless device (such as cellular telephone 12), as shown at step 90, and then a decision is made as to whether the wireless device is able to display a message, as shown at decision 92. The decision can be made based upon data exchanged directly with the wireless device, the wireless network 14, or based upon stored data on the capability of the wireless device. If the wireless device 12 cannot display a message at decision 92, then the application download server 16 transmits the data necessary to effect and interconnection between the wireless device 12 and the application download server 16 such that the wireless device 12 can have access to the downloadable applications. If the wireless device is able to display a transmitted message at decision 92, then a decision is made as to whether the wireless device 12 is part of a predefined group or demographic, as shown at decision 96.

If the wireless device 12 is not part of a predefined group at decision 96, then a general message is transmitted to the wireless device, such as a general advertisement, as shown at step 98. The transmission of the general message can occur from the application download server 16 or from a messaging server 32. Otherwise, if the wireless device is a part of a predefined group at decision 96, then a group-specific message is sent to the wireless device 12, at shown at step 100, from either the application download server 16 or a group-specific messaging server 32. After either the general message at step 98 or the group-specific message at step 100 has been sent to the wireless device 12, the application download server 16 transmits the downloadable application interconnection data to the wireless device 12 such that the wireless device 12 can have navigable access to the applications of the application download server 16.

If the system 10 is embodied to send messages to the wireless device 12, 18, 20, and 22 upon changing file access in navigating the data structure of the application download server 16, then once the full interaction is achieved, the application download server 16 determines if the user has changed file access, as shown at decision 104. If the user has not changed file access, then the process repeats the decision at 104 while the user is navigating the application download server 16. If the user has changed file access at decision 104, then a message is transmitted to the wireless device 12, 18, 20, and 22 while the file access changes, as shown at step 106, and the application download server 16 again determines if the user has changed file access at decision 104. The message transmitted at step 106 can be sent from the application download server 16 or from a separate messaging server 32 to the wireless device.

The system 10 thus includes a method for providing a message on the graphic display 13, 19, 21, and 23 of a wireless device 12, 18, 20, and 22, having the steps of attempting to communicate from the wireless device 12, 18, 20, and 22 to the application download server 16 across the wireless network 14, such as would occur if the user activates a hyperlink within a message transmitted at the original connection attempt, transmitting a message to the wireless device 12, 18, 20, and 22 across the wireless network 14 where the message for display on the graphic display 13, 19, 21, and 23 of the wireless device 12, 18, 20, and 22, receiving the transmitted message at the computer platform 50 of the wireless device 12, 18, 20, and 22, and displaying the transmitted message on the graphic display 13, 19, 21, and 23 of the wireless device 12, 18, 20, and 22. And if the wireless device 12, 18, 20, and 22 is part of a predefined group, the method further includes identifying the group that the wireless device is part of when the wireless device 12, 18, 20, and 22 attempts to communicate with the application download server 16 across the wireless network 14, transmitting a group-specific message to the computer platform 50 of the wireless device, receiving the group-specific message at the computer platform 50 of the wireless device 12, 18, 20, and 22, and displaying the group-specific message on the graphic display 13, 19, 21, and 23 of the wireless device 12, 18, 20, and 22.

The method can also include sending messages to the wireless device 12, 18, 20, and 22 instead of the initial connection attempt, or the message can be secondary to the message transmitted at the initial connection attempt. The method can thus includes attempting to connect from the wireless device 12, 18, 20, and 22 to a second application download server 16 across the wireless network 14, transmitting a second message to the computer platform 50 of the wireless device 12, 18, 20, and 22 across the wireless network 14, receiving the second message at the computer platform 50 of the wireless device 12, 18, 20, and 22, and displaying the second transmitted message on the graphic display 13, 19, 21, and 23 of the wireless device 12, 18, 20, and 22. And if the wireless device 12, 18, 20, and 22 can navigate the data structure or file structure of the application download server 16, then the method can include interacting, from the wireless device 12, 18, 20, and 22, with a file structure on the application download server 16, attempting to change interaction with a file on the application download server 16, transmitting a second message to the computer platform 50 of the wireless device 12, 18, 20, and 22 across the wireless network 14 (either from application download server 16 or messaging server 32), receiving the second message at the computer platform 50 of the wireless device 12, 18, 20, and 22, and displaying the second transmitted message on the graphic display 13, 19, 21, and 23 of the wireless device 12, 18, 20, and 22.

In view of the method being executable on the computer platform of a wireless device 12, 18, 20, and 22, the present invention includes a program resident in a computer readable medium, where the program directs a wireless device having a computer platform to perform the method. The computer readable medium can be the memory 58 of the computer platform 50 of the cellular telephone 12, or other wireless device, or can be in a local database, such as local database 60 of the cellular telephone 12. Further, the computer readable medium can be in a secondary storage media that is loadable onto a wireless device computer platform, such as a magnetic disk or tape, optical disk, hard disk, flash memory, or other storage media as is known in the art.

The present invention may be implemented, for example, by operating portion(s) of the wireless network 14 to execute a sequence of machine-readable instructions, such as wireless platform 50, the application download server 16, and messaging server 32. The instructions can reside in various types of signal-bearing or data storage primary, secondary, or tertiary media. The media may comprise, for example, RAM (not shown) accessible by, or residing within, the components of the wireless network 14. Whether contained in RAM, a diskette, or other secondary storage media, the instructions may be stored on a variety of machine-readable data storage media, such as DASD storage (e.g., a conventional "hard drive" or a RAID array), magnetic tape, electronic read-only memory (e.g., ROM, EPROM, or EEPROM), flash memory cards, an optical storage device (e.g. CD-ROM, WORM, DVD, digital optical tape), paper "punch" cards, or other suitable data storage media including digital and analog transmission media.

While the foregoing disclosure shows illustrative embodiments of the invention, it should be noted that various changes and modifications could be made herein without departing from the scope of the invention as defined by the appended claims. Furthermore, although elements of the invention may be described or claimed in the singular, the plural is contemplated unless limitation to the singular is explicitly stated.

What is claimed is:

1. An information download system comprising:
    a wireless communications interface for communicating with a wireless device over a wireless network;
    a first processing component, coupled to said wireless communications interface, for providing requested information in response to receiving an information download request from said wireless device; and
    a second processing component, coupled to said wireless communications interface, for providing a message to said wireless device,
    wherein said message is unrelated to a status of said information download request, and further wherein said message is provided after receiving said information download request and before providing said requested information, and further wherein the message includes advertising content to be presented by the wireless device.

2. The information download system of claim 1, wherein said wireless communications interface comprises:
    at least one base station, each base station for communicating over the wireless network;
    a wired network, for coupling said wireless communications interface with said first and second processing components; and
    a message service controller, coupled to and interfacing between said wireless network and said wired network.

3. The information download system of claim 2, wherein said at least one base station comprises a plurality of base stations.

4. The information download system of claim 1, wherein said requested information comprises an application executable on said wireless device.

5. The information download system of claim 4, wherein said application comprises a game.

6. The information download system of claim 4, wherein said application comprises a stock monitor.

7. The information download system of claim 1, wherein said requested information comprises data for rendering on said wireless device.

8. The information download system of claim 7, wherein said data comprises news.

9. The information download system of claim 7, wherein said data comprises sports information.

10. The information download system of claim 1, wherein said message comprises text.

11. The information download system of claim 1, wherein said message comprises graphics.

12. The information download system of claim 1, wherein said message comprises multimedia.

13. The information download system of claim 1, wherein said message comprises a network object.

14. The information download system of claim 13, wherein said network object comprises a hyperlink.

15. The information download system of claim 13, wherein said network object comprises an applet.

16. The information download system of claim 1, wherein said first and second processing components each comprise a respective computer system.

17. The information download system of claim 1, wherein said first and second processing components are each respectively portions of a computer system.

18. An information download system comprising:
a wireless communications means, for communicating with a wireless device over a wireless network;
a first processing means, coupled said wireless communications means, for providing requested information in response to receiving an information download request from said wireless device; and
a second processing means, coupled to said wireless communications means, for providing a message to said wireless device,
wherein said message is unrelated to a status of said information download request, and further wherein said message is provided after receiving said information download request and before providing said requested information, and further wherein the message includes advertising content to be presented by the wireless device.

19. A method for providing information to a wireless device, comprising:
(a) receiving, over a wireless network, a request for a first information from the wireless device;
(b) after step (a), retrieving said first information;
(c) sending, over the wireless network to the wireless device, a second information, the second information including advertising content to be presented by the wireless device; and
(d) after step (b), sending said retrieved first information to said wireless device,
wherein step (c) is performed after step (a), and further wherein step (c) is performed before step (d).

20. The method of claim 19, wherein step (d) is also performed after step (c).

21. The method of claim 19, wherein step (c) is performed after initiating step (b).

22. The method of claim 19, wherein said first information comprises application code executable on said wireless device.

23. The method of claim 22, wherein said first information comprises a game.

24. The method of claim 22, wherein said first information comprises a stock monitor.

25. The method of claim 19 wherein said first information comprises data for rendering on said wireless device.

26. The method of claim 25, wherein said data comprises news.

27. The method of claim 25, wherein said data comprises sports information.

28. The method of claim 19, wherein said second information comprises text.

29. The method of claim 19, wherein said second information comprises graphics.

30. The method of claim 19, wherein said second information comprises multimedia.

31. The method of claim 19, wherein said second information comprises a network object.

32. The method of claim 31, wherein said network object comprises a hyperlink.

33. The method of claim 31, wherein said network object comprises an applet.

34. A machine readable storage medium comprising instructions, which when executed by a machine causes said machine to perform operations, the instructions comprising:
(a) at least one instruction for receiving, over a wireless network, a request for a first information from a wireless device;
(b) after step (a), at least one instruction for retrieving said first information;
(c) at least one instruction for sending, over the wireless network to the wireless device, a second information, the second information including advertising content to be presented by the wireless device; and
(d) after step (b), at least one instruction for sending said retrieved first information to said wireless device,
wherein step (c) is performed after step (a), and step (c) is performed before step (d), and further wherein said second information is unrelated to a status of said first information.

35. A method for obtaining requested information over a wireless network, comprising:
(a) sending, over the wireless network, a request for a first information;
(b) after step (a), receiving, from the wireless network, a second information, the second information including advertising content to be presented by a wireless device; and
(c) after step (b), receiving, from the wireless network, said first information,
wherein said second information is unrelated to a status of said first information.

36. The method of claim 35, further comprising:
(b)(1) after step (b) and before step (c), displaying said second information on a display.

37. A machine readable storage medium comprising instructions, which when executed by a machine causes said machine to perform operations, the instructions comprising:
(a) at least one instruction for sending, over a wireless network, a request for a first information;
(b) after step (a), at least one instruction for receiving, from the wireless network, a second information, the second information including advertising content to be presented by a wireless device; and
(c) after step (b), at least one instruction for receiving, from the wireless network, said first information,
wherein said second information is unrelated to a status of said first information.

38. A wireless device comprising:
a wireless communications portal for communicating with a wireless network; and
a computer platform coupled to said wireless communications portal, the computer platform controlling said wireless communications portal and comprising:
a processing element; and
a memory for storing:
a first logic configured to control said wireless communications portal to send an information download request over said wireless network;
a second logic configured to control said wireless communications portal to receive over said wireless network information corresponding to said information download request; and
a third logic configured to control said wireless communications portal to receive from said wireless network a message unrelated to a status of said information download request during a time between the sending of said information download request and receipt of information corresponding to said information download request, wherein the message includes advertising content to be presented by the wireless device.

39. The wireless device of claim 38, further comprising:
a display coupled to said computer platform, said display being controlled by said computer platform,
wherein said memory is further for storing a fourth logic configured to show said message on said display.

40. A wireless device comprising:
a wireless communications means for communicating with a wireless network; and
a computer platform means coupled to said wireless communications means, the computer platform means controlling said wireless communications means and comprising:
 a processing element means; and
 a memory means for storing:
  a first logic means configured to control said wireless communications means to send an information download request over said wireless network;
  a second logic means configured to control said wireless communications means to receive over said wireless network information corresponding to said information download request; and
a third logic means configured to control said wireless communications means to receive over said wireless network a message unrelated to a status of said information download request during a time between the sending of said information download request and the receipt of information corresponding to said information download request, wherein the message includes advertising content to be presented by the wireless device.

* * * * *